US009801158B1

(12) United States Patent
Yuan et al.

(10) Patent No.: US 9,801,158 B1
(45) Date of Patent: Oct. 24, 2017

(54) SELECTIVE CALL ROUTING AND NOTIFICATION FOR MULTI-ENDPOINT TERMINALS

(71) Applicant: Verizon Patent and Licensing Inc., Arlington, VA (US)

(72) Inventors: Jun Yuan, Cranbury, NJ (US); Yuk Lun Li, Morganville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/182,169

(22) Filed: Jun. 14, 2016

(51) Int. Cl.
| G01R 3/00 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04W 4/00 | (2009.01) |
| H04W 68/02 | (2009.01) |
| H04W 60/04 | (2009.01) |
| H04W 68/00 | (2009.01) |
| H04W 4/02 | (2009.01) |

(52) U.S. Cl.
CPC ......... *H04W 68/02* (2013.01); *H04W 4/023* (2013.01); *H04W 60/04* (2013.01); *H04W 68/005* (2013.01)

(58) Field of Classification Search
CPC .................................................... H04M 1/006
USPC ............................... 370/229, 310, 331, 400
See application file for complete search history.

(56) References Cited

U.S. PATENT DOCUMENTS

| 8,144,578 | B2* | 3/2012 | Jacobsohn | ........... H04Q 3/0045 370/229 |
| 8,885,601 | B2* | 11/2014 | Blackburn | ............ H04M 1/006 370/331 |
| 2010/0223336 | A1* | 9/2010 | Fu | ........................ G06F 17/3069 709/205 |
| 2011/0243141 | A1* | 10/2011 | Blackburn | ............ H04M 1/006 370/400 |
| 2012/0163256 | A1* | 6/2012 | Kang | .................. H04L 12/4625 370/310 |
| 2012/0221726 | A1* | 8/2012 | Nguyen | .............. H04L 61/2575 709/225 |
| 2016/0006744 | A1* | 1/2016 | Du | ........................ H04L 63/102 726/4 |
| 2016/0239547 | A1* | 8/2016 | Lim | .................. G06F 17/30528 |

* cited by examiner

Primary Examiner — William D Cumming (57) ABSTRACT

A device may obtain information. The information may represent a distance between a first user device and a second user device. The first user device and the second user device may share a destination address. The device may receive a first message associated with a call. The first message may be received based on the call having been made to the destination address. The device may determine, based on the information, whether to provide a second message associated with the call or a notification associated with the call. The device may selectively provide the second message or the notification based on determining whether to provide the second message or the notification.

20 Claims, 6 Drawing Sheets

SELECTIVE CALL ROUTING AND NOTIFICATION FOR MULTI-ENDPOINT TERMINALS

BACKGROUND

A destination address, for switching and/or routing calls to a destination, (e.g., a telephone number, a mobile device number (MDN), a mobile identification number (MIN), a mobile subscription identification number (MSIN), an international mobile subscriber identity (IMSI), a temporary mobile subscriber identity (TMSI), or another address) may be shared by multiple user devices (e.g., a multi-endpoint terminal). For example, a first user device (e.g., a smart phone) may share a destination address with a second user device (e.g., a tablet computer, a wearable device (e.g., a smart watch or the like), a laptop computer, or the like). By having multiple user devices share a destination address, a user may use any of the multiple user devices to receive and/or to make a call (e.g., a voice call, a voice over Internet protocol (VoIP) call, a video call, a data call (e.g., to send a short message service (SMS) message, a fax, or the like), a media session, or the like) using a single destination address.

DETAILED DESCRIPTION OF PREFERRED EMBODIMENTS

The following detailed description of example implementations refers to the accompanying drawings. The same reference numbers in different drawings may identify the same or similar elements.

When multiple user devices are associated with a shared destination address, a call to the shared destination address may be routed to multiple user devices and/or multiple user devices may provide a call notification for the call (e.g., ring, vibrate, provide a visual indicator, or the like). Thus, even though multiple user devices may be at or near the same location, the multiple user devices may each receive the call and provide a separate notification of the call. Additionally, multiple user devices that receive and/or provide a notification of a call, in different locations, may allow an unintended user to answer a call and/or provide an opportunity for an unauthorized user device to pull a call from another user device.

Implementations described herein may enable selective call routing and notification for multi-endpoint terminals. Selective call routing and notification for multi-endpoint terminals may enable a user and/or a network operator to control which user device will receive a call and/or which user device provides a notification of the call. Controlling which user device receives and/or provides a notification of a call may reduce situations where multiple user devices, at or near the same location, provide notifications of the same call and/or where multiple user devices receive the same call at different locations.

Figure 1A:
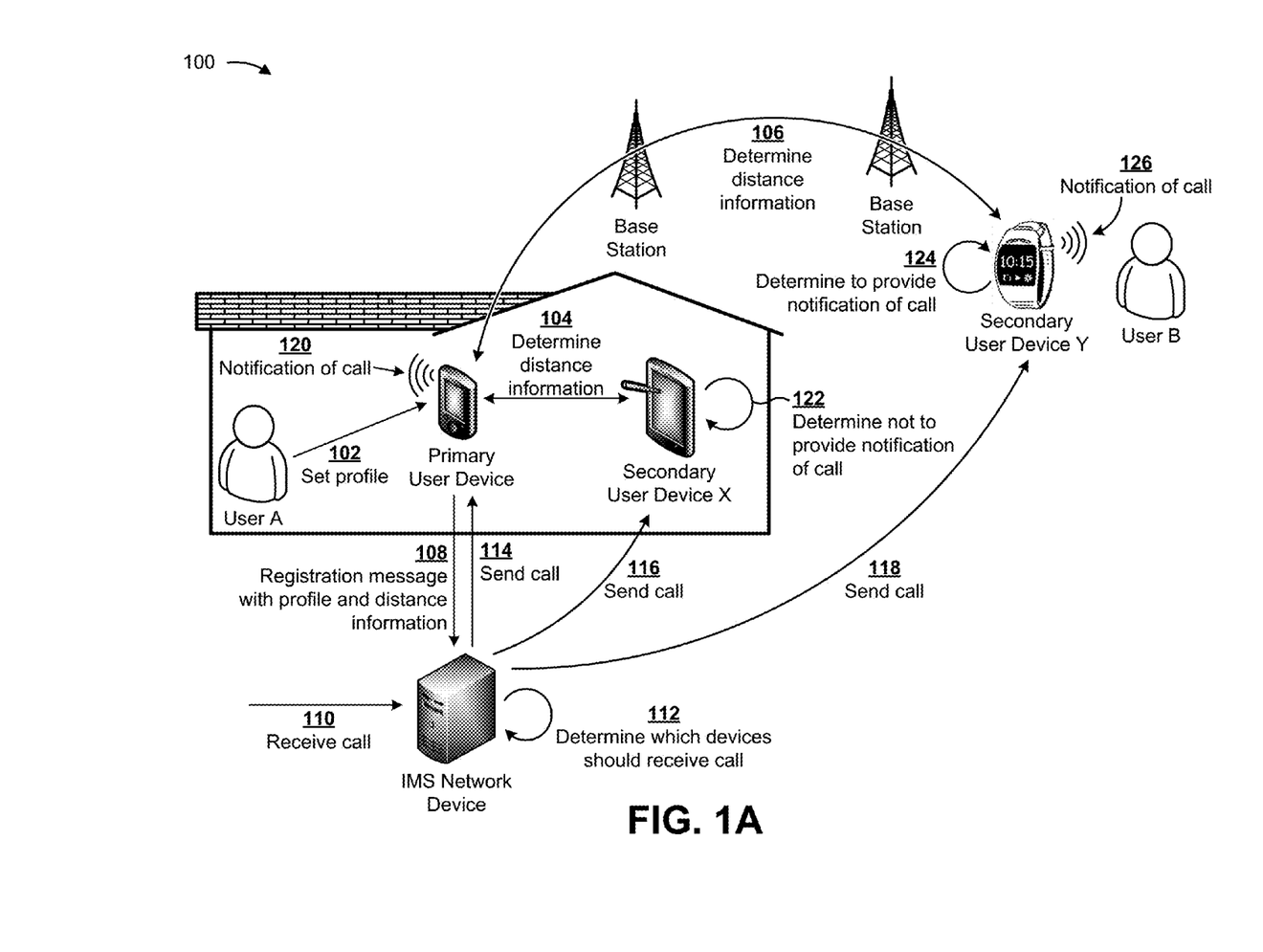
FIGS. 1A and 1B are diagrams of an overview of an example implementation described herein.
Figure 1B:
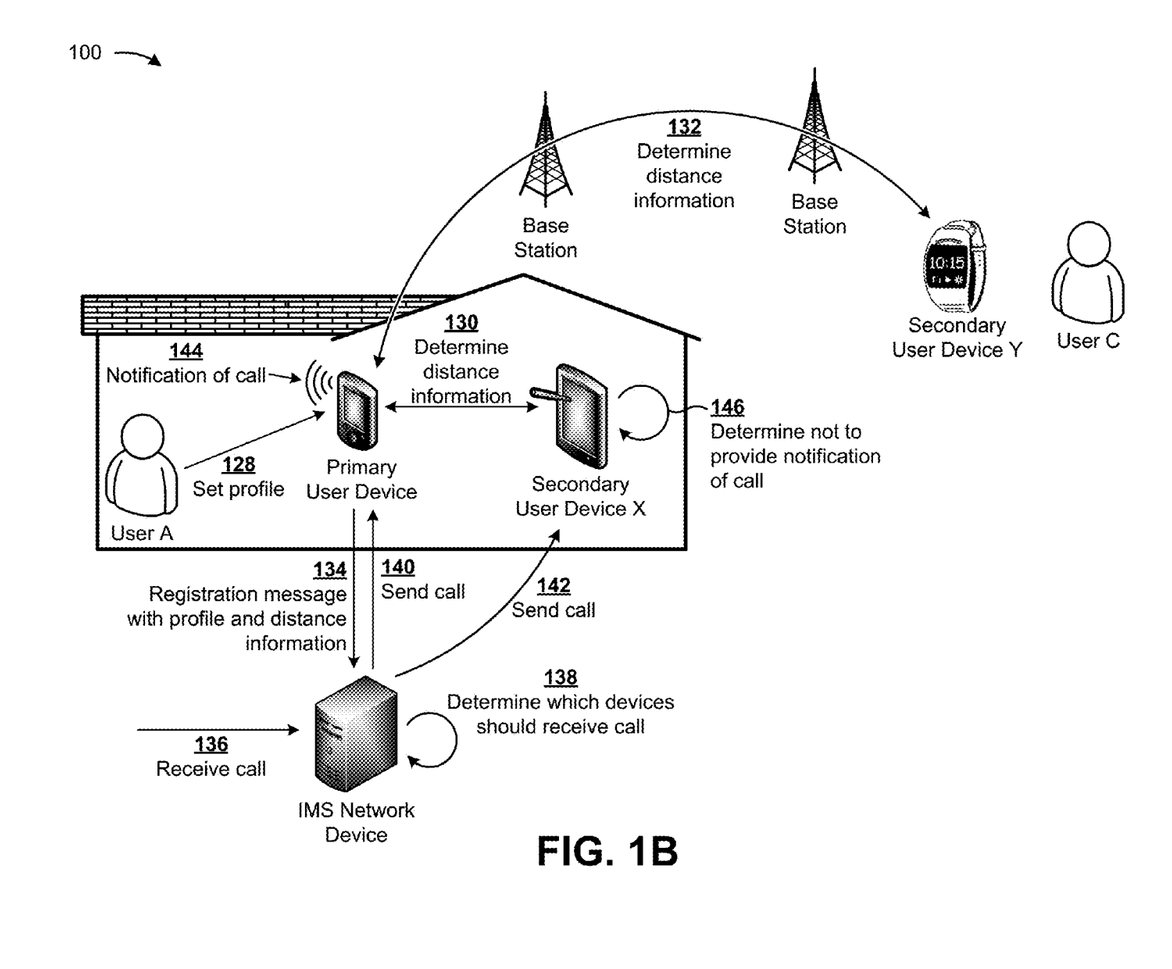

FIGS. 1A and 1B are diagrams of an overview of an example implementation 100 described herein. For the purposes of this overview, assume that an Internet protocol (IP) multimedia subsystem (IMS) network device and various user devices (e.g., a primary user device, a secondary user device X, and/or a secondary user device Y) are receiving and/or sending messages (e.g., session initiation protocol (SIP) messages, Signaling System 7 (SS7) messages, or the like) associated with setting up and/or routing a call (hereinafter referred to as a "call message" or "call messages"). Thus, references to receiving and/or sending a call should be understood as including receiving and/or sending a call message associated with the call.

For the purpose of FIG. 1A, assume that the primary user device, the secondary user device X, and the secondary user device Y are all associated with the same destination address (e.g., the destination address is a shared destination address). Further assume that a user A and a user B are associated with the primary user device, the secondary user device X, and the secondary user device Y. In some implementations, user A and user B may represent the same user at different times. As shown in FIG. 1A, and by reference number 102, user A may set a profile for the primary user device, the secondary user device X, the secondary user device Y, and/or the destination address. The profile may specify that the IMS network device is to send a call, made to the destination address, to the primary user device, the secondary user device X, and/or the secondary user device Y. The profile may further specify that the primary user device should always provide a call notification for a received call, while the secondary user device X and the secondary user device Y should not provide a call notification when less than a threshold distance from the primary user device. In this way, the user devices may conserve computing and/or power resources by preventing multiple user devices from providing a notification of the same call when the user devices are near one another.

As shown by reference number 104, the primary user device and/or the secondary user device X may determine distance information (e.g., a proximity, a spatial relationship, a signal strength, or the like) for the secondary user device X. For example, the primary user device may determine that the secondary user device X is less than a threshold distance from the primary user device based on a signal strength (e.g., a BLUETOOTH received signal strength indicator (RSSI) value or the like) being greater than a threshold. In some implementations, the primary user device may send the distance information to the secondary user device X.

As shown by reference number 106, the primary user device and/or the secondary user device Y may determine distance information for the secondary user device Y. For example, the primary user device may determine that the secondary user device Y is greater than a threshold distance from the primary user device (e.g., based on the secondary user device Y and the primary user device being connected to different base stations). In some implementations, the primary user device may send the distance information to the secondary user device Y. As shown by reference number 108, the primary user device may send, to the IMS network device (e.g., a telecommunication application server (TAS)

or the like), a registration message (e.g., a SIP REGISTER request message or the like) that includes the profile and/or the distance information.

As shown by reference number 110, the IMS network device may receive a call to the destination address shared by the primary user device, the secondary user device X, and the secondary user device Y. As shown by reference number 112, and based on receiving the call, the IMS network device may determine which user device(s) should receive the call. Assume that the IMS network device determines that the primary user device, the secondary user device X, and the secondary user device Y should all receive the call (e.g., based on the profile and/or the distance information). Based on determining that the primary user device, the secondary user device X, and the secondary user device Y should all receive the call, the IMS network device may send the call to the primary user device, to the secondary user device X, and to the secondary user device Y (as shown by reference numbers 114, 116, and 118).

As shown by reference number 120, and based on receiving the call from the IMS network device, the primary user device may provide a notification of the call, such that user A may answer the call with the primary user device. For example, the primary user device may, based on the profile, ring, vibrate, display call information, provide other visual indicators (e.g., display an image or flashing lights), or the like.

As shown by reference number 122, and based on receiving the call from the IMS network device, the secondary user device X may determine, based on the profile and the secondary user device X being less than the threshold distance from the primary user device, not to provide a notification of the call. Although secondary user device X may not provide a notification of the call, the call may still be answered (e.g., by user A) with the secondary user device X because the secondary user device X received the call from the IMS network device.

As shown by reference number 124, and based on receiving the call from the IMS network device, the secondary user device Y may determine to provide a notification of the call. For example, the secondary user device Y may determine to provide the notification based on the profile, the secondary user device Y being greater than the threshold distance from the primary user device, and/or because there is not another user device nearby that provides a notification of the call. Based on determining to provide a notification of the call, the secondary user device Y may provide a notification of the call, as shown by reference number 126, such that user B may answer the call with the secondary user device Y. In some implementations (e.g., when user A and user B represent the same user at different times), a user may have set the profile (e.g., as user A) to enable the user to answer the call (e.g., as user B) with the secondary user device Y when the user is with the secondary user device Y and the secondary user device Y is greater than the threshold distance from the primary user device.

For the purpose of FIG. 1B, assume that the primary user device, the secondary user device X, and the secondary user device Y are all associated with the same destination address. As shown in FIG. 1B, and by reference number 128, user A may set a profile for the primary user device, for the secondary user device X, for the secondary user device Y, and/or for the destination address. The profile may specify that the IMS network device should not send a call to a secondary user device that is greater than a threshold distance from the primary user device. The profile may further specify that the primary user device should always provide a notification of a received call, while the secondary user devices should not provide a call notification when the secondary user devices are less than a threshold distance from the primary user device. In this way, the IMS network device may conserve network resources by preventing transmission of multiple messages to multiple user devices in certain situations.

As shown by reference number 130, the primary user device and/or the secondary user device X may determine distance information for the secondary user device X, as described above in connection with reference number 104 in FIG. 1A. As shown by reference number 132, the primary user device and/or the secondary user device Y may determine distance information for the secondary user device Y, as described above in connection with reference number 106 in FIG. 1A. As shown by reference number 134, the primary user device may send, to the IMS network device, a registration message that includes the profile and/or the distance information.

As shown by reference number 136, the IMS network device may receive a call to the shared destination address. As shown by reference number 138, and based on receiving the call, the IMS network device may determine which devices should receive the call. Assume that the IMS network device determines (e.g., based on the profile and/or the distance information) that the primary user device and the secondary user device X should receive the call. Further assume that the IMS network device determines that the secondary user device Y should not receive the call (e.g., based on the profile and the secondary user device Y being greater than the threshold distance from the primary user device). In some implementations, not sending the call to the secondary user device Y may prevent the user C, who may not be authorized to receive the call, from using the secondary user device Y to answer the call. Based on determining that the primary user device and the secondary user device X, but not the secondary user device Y, should receive the call, the IMS network device may send the call to the primary user device and to the secondary user device X (as shown by reference numbers 140 and 142).

As shown by reference number 144, and based on receiving the call from the IMS network device, the primary user device may provide a notification of the call, such that user A may answer the call using the primary user device. As shown by reference number 146, and based on receiving the call from the IMS network device, the secondary user device X may determine, based on the profile and the secondary user device X being less than the threshold distance from the primary user device, not to provide a notification of the call. Although secondary user device X may not provide a notification of the call, the call may still be answered with secondary user device X because secondary user device X received the call and user A may have received a notification of the call via the primary user device.

In this way, implementations described herein may enable selective call routing and notification for multi-endpoint terminals. Selective call routing and notification for multi-endpoint terminals may enable a user and/or a network operator to control which user device will receive a call and/or which user device provides a notification of the call. Selective call routing to a subset of user devices associated with a shared destination address may reduce network resources that might otherwise be consumed by indiscriminately sending a call to all user devices associated with the shared destination address. Selective call routing and notification may additionally, or alternatively, conserve user device processor and/or power resources by reducing the number of calls a user device receives and/or reducing the number of call notifications a user device makes. Selective call routing may improve call security by not sending a call to a user device that is not proximate to a primary user device, which may prevent an unauthorized user from answering a call and/or may reduce the chances of an unauthorized secondary user device pulling a call from a distant and/or compromised secondary user device.

As indicated above, FIGS. 1A and 1B are provided merely as an example. Other examples are possible and may differ from what was described with regard to FIGS. 1A and 1B.

Figure 2:
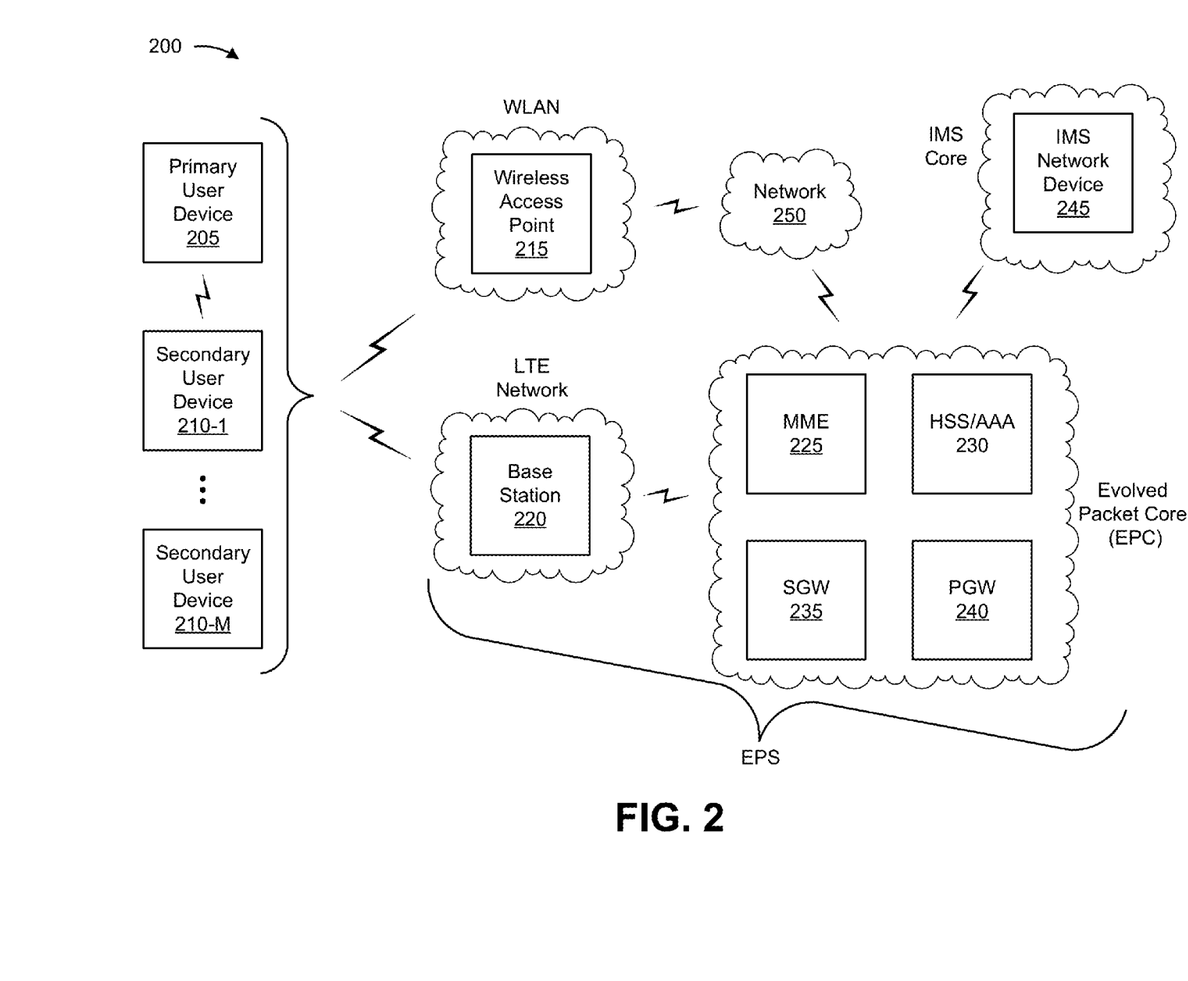
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a primary user device 205, one or more secondary user devices 210-1 through 210-M (M≥1) (hereinafter referred to collectively as "secondary user devices 210," and individually as "secondary user device 210"), a wireless access point 215, a base station 220, a mobility management entity device (MME) 225, a home subscriber server/authentication, authorization, and accounting server (HSS/AAA) 230, a serving gateway (SGW) 235, a packet data network gateway (PGW) 240, an IMS network device 245, and a network 250. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network, a code division multiple access (CDMA) network, or another type of network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 220 that take the form of evolved Node Bs (eNBs) via which primary user device 205 and/or secondary user device 210 may communicate with the EPC. The EPC may include MME 225, HSS/AAA 230, SGW 235, and/or PGW 240 that enable primary user device 205 and/or secondary user device 210 to communicate with network 250 and/or an IMS core. The IMS core may include IMS network device 245. HSS/AAA 230 may reside in the EPC and/or the IMS core.

Primary user device 205 includes one or more devices capable of communicating with base station 220, wireless access point 215, and/or a network (e.g., network 250). For example, primary user device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, a wearable communication device (e.g., a pair of smart eyeglasses, a smart watch, etc.), and/or a similar device. Primary user device 205 may send traffic to and/or receive traffic from network 250 (e.g., via wireless access point 215, base station 220, SGW 235, and/or PGW 240). In some implementations, primary user device 205 may be capable of directly communicating with secondary user device 210 (e.g., via short-range wireless communication, such as via BLUETOOTH, BLUETOOTH low energy, ZIGBEE (e.g., as defined in the Institute of Electrical and Electronics Engineers' (IEEE) 802.15.4 standard), or the like).

In some implementations, a user (e.g., a user of primary user device 205) may designate, as a primary user device 205 for a shared destination address, a user device that is associated with the destination address. In some implementations, a user may designate a different user device associated with the destination address to be a new primary user device 205 for the destination address (e.g., the user may change which user device is primary user device 205). In some implementations, another entity (e.g., IMS network device 245, HSS/AAA 230, or the like) may designate a user device that is associated with a shared destination address to be a primary user device 205 for the destination address.

Secondary user device 210 includes one or more devices capable of communicating with base station 220, wireless access point 215, and/or a network (e.g., network 250). For example, secondary user device 210 may include a wireless communication device, a radiotelephone, a PCS terminal, a smart phone, a laptop computer, a tablet computer, a personal gaming system, a wearable communication device (e.g., a pair of smart eyeglasses, a smart watch, etc.), and/or a similar device. Secondary user device 210 may send traffic to and/or receive traffic from network 250 (e.g., via wireless access point 215, base station 220, SGW 235, and/or PGW 240). In some implementations, secondary user device 210 may be capable of directly communicating with primary user device 205 (e.g., via short-range wireless communication, such as via BLUETOOTH, BLUETOOTH low energy, ZIGBEE, or the like).

In some implementations, secondary user device 210 may include a user device, other than primary user device 205, that is associated with the same destination address as primary user device 205. In some implementations, a user (e.g., a user of primary user device 205) may associate one or more secondary user devices 210 with a destination address that is associated with primary user device 205. In some implementations, a secondary user device 210 may additionally be associated with another destination address (e.g., a destination address that is different from the destination address with which primary user device 205 is associated).

Wireless access point 215 includes one or more devices, associated with a wireless local area network (WLAN), that may receive, process, and/or transmit data traffic, such as audio, video, text, and/or other data traffic, destined for and/or received from primary user device 205, secondary user device 210, and/or network 250. For example, wireless access point 215 may include a router, a bridge, a gateway, a base station, or another type of network device. In some implementations, wireless access point 215 may regulate access to the associated WLAN. In some implementations, wireless access point 215 may be a WiFi access point for an associated WiFi network. In some implementations, a WiFi interface, a WiFi device, and/or a WiFi network may include an interface, a device, and/or a network that communicates wirelessly (e.g., using the 2.4 gigahertz (GHz) and 5 GHz radio frequency (RF) spectrum bands) using a WLAN based on the IEEE 802.11 standards (e.g., WiFi).

Base station 220 includes one or more devices capable of transferring traffic, such as audio, video, text, and/or other traffic, destined for and/or received from primary user device 205 and/or secondary user device 210. In some implementations, base station 220 may include an eNB associated with the LTE network that receives traffic from and/or sends traffic to network 250 via SGW 235 and/or PGW 240. Additionally, or alternatively, one or more base stations 220 may be associated with a radio access network that is not associated with the LTE network. Base station 220 may send traffic to and/or receive traffic from primary user device 205 and/or secondary user device 210 via an air interface. In some implementations, base station 220 may include a small cell base station, such as a base station of a microcell, a picocell, and/or a femtocell.

MME 225 includes one or more devices, such as one or more server devices, capable of managing authentication, activation, deactivation, and/or mobility functions associated with primary user device 205 and/or secondary user device 210. In some implementations, MME 225 may perform operations relating to authentication of primary user device 205 and/or secondary user device 210. Additionally, or alternatively, MME 225 may facilitate the selection of a particular SGW 235 and/or a particular PGW 240 to serve traffic to and/or from primary user device 205 and/or secondary user device 210. MME 225 may perform operations associated with handing off primary user device 205 and/or secondary user device 210 from a first base station 220 to a second base station 220 when primary user device 205 and/or secondary user device 210 are transitioning from a first cell associated with the first base station 220 to a second cell associated with the second base station 220. Additionally, or alternatively, MME 225 may select another MME (not pictured), to which primary user device 205 and/or secondary user device 210 should be handed off (e.g., when primary user device 205 and/or secondary user device 210 move out of range of MME 225).

HSS/AAA 230 includes one or more devices, such as one or more server devices, capable of managing (e.g., receiving, generating, storing, processing, and/or providing) information associated with primary user device 205 and/or secondary user device 210. For example, HSS/AAA 230 may manage subscription information associated with primary user device 205 and/or secondary user device 210, such as information that identifies a subscriber profile of a user associated with primary user device 205 and/or secondary user device 210, information that identifies services and/or applications that are accessible to primary user device 205 and/or secondary user device 210, location information associated with primary user device 205 and/or secondary user device 210, a network identifier (e.g., a network address) that identifies primary user device 205 and/or secondary user device 210, information that identifies a treatment of primary user device 205 and/or secondary user device 210 (e.g., quality of service information, a quantity of minutes allowed per time period, a quantity of data consumption allowed per time period, etc.), and/or similar information. In some implementations, HSS/AAA 230 may provide this information to one or more other devices of environment 200 to support the operations performed by those devices.

HSS/AAA 230 additionally, or alternatively, includes one or more devices, such as one or more server devices, capable of performing authentication, authorization, and/or accounting operations for communication sessions associated with primary user device 205 and/or secondary user device 210. For example, HSS/AAA 230 may perform authentication operations for primary user device 205 and/or secondary user device 210 and/or a user of primary user device 205 and/or secondary user device 210 (e.g., using one or more credentials). Additionally, or alternatively, HSS/AAA 230 may control access, by primary user device 205 and/or secondary user device 210, to a service and/or an application (e.g., based on one or more restrictions, such as time-of-day restrictions, location restrictions, single or multiple access restrictions, read/write restrictions, etc.), may track resources consumed by primary user device 205 and/or by secondary user device 210 (e.g., a quantity of voice minutes consumed, a quantity of data consumed, etc.), and/or may perform similar operations.

SGW 235 includes one or more devices capable of routing packets. For example, SGW 235 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 235 may aggregate traffic received from one or more base stations 220 associated with the LTE network, and may send the aggregated traffic to network 250 (e.g., via PGW 240) and/or other network devices associated with the EPC and/or the IMS core. SGW 235 may also receive traffic from network 250 and/or other network devices, and may send the received traffic to primary user device 205 and/or secondary user device 210 via base station 220. Additionally, or alternatively, SGW 235 may perform operations associated with handing off primary user device 205 and/or secondary user device 210 to and/or from an LTE network.

PGW 240 includes one or more devices capable of providing connectivity for primary user device 205 and/or secondary user device 210 to external packet data networks (e.g., other than the depicted EPC and/or LTE network). For example, PGW 240 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 240 may aggregate traffic received from one or more SGWs 235, and may send the aggregated traffic to network 250. Additionally, or alternatively, PGW 240 may receive traffic from network 250, and may send the traffic to primary user device 205 and/or secondary user device 210 via SGW 235 and base station 220. PGW 240 may record data usage information (e.g., byte usage), and may provide the data usage information to HSS/AAA 230.

IMS network device 245 includes one or more devices capable of originating, sending, receiving, processing, controlling, and/or transferring traffic and/or a message (e.g., a SIP message or the like) associated with a call (e.g., a voice call, a VoIP call, a video call, a data call, a media session, or the like) to a destination address associated with primary user device 205 and/or secondary user device 210. For example, IMS network device 245 may include a server, a gateway, a router, a modem, a switch, a firewall, a NIC, a hub, a bridge, a signaling end point, a reverse proxy, a server (e.g., a proxy server), a security device, an intrusion detection device, a load balancer, an OADM, an end office switch, a softswitch, a base station, an IMS core device, or the like. In some implementations, IMS network device 245 may include an application server (e.g., a telecommunication application server (TAS) or the like), an interrogating call session control function device (I-CSCF), a serving call session control function device (S-CSCF), a proxy call session control function device (P-CSCF), or the like.

Network 250 includes one or more wired and/or wireless networks. For example, network 250 may include a VoIP network, an IMS network, a session initiation protocol (SIP) network, a Signaling System 7 (SS7) network, a cellular network (e.g., a long-term evolution (LTE) network, a third generation (3G) network, a code division multiple access (CDMA) network, or the like), a public land mobile network (PLMN), a local area network (LAN), a wireless LAN (e.g., a WiFi network), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
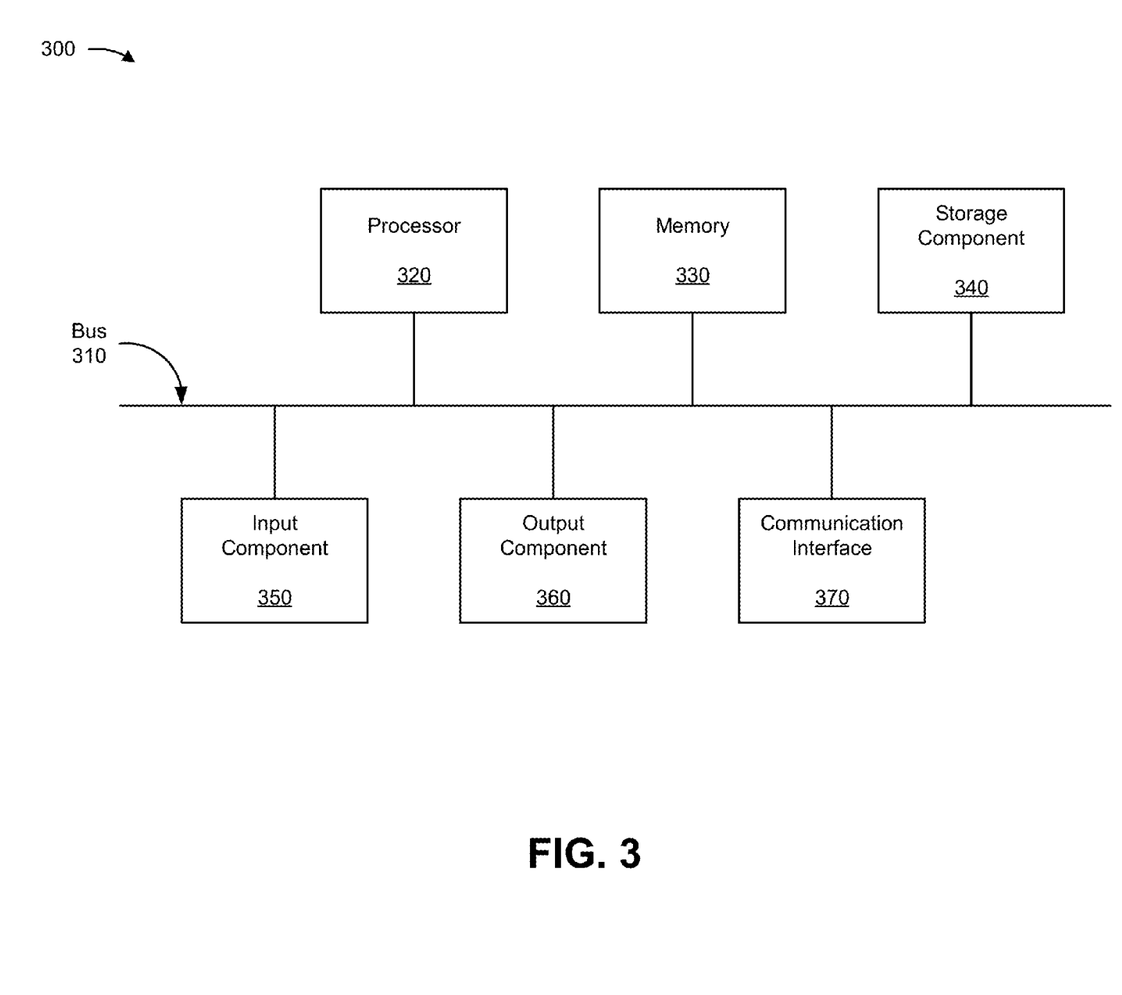
FIG. 3 is a diagram of example components of one or more devices of FIG. 2.

FIG. 3 is a diagram of example components of a device 300. Device 300 may correspond to primary user device 205, secondary user device 210, wireless access point 215, base station 220, MME 225, HSS/AAA 230, SGW 235, PGW 240, and/or IMS network device 245. In some implementations, primary user device 205, secondary user device 210, wireless access point 215, base station 220, MME 225, HSS/AAA 230, SGW 235, PGW 240, and/or IMS network device 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
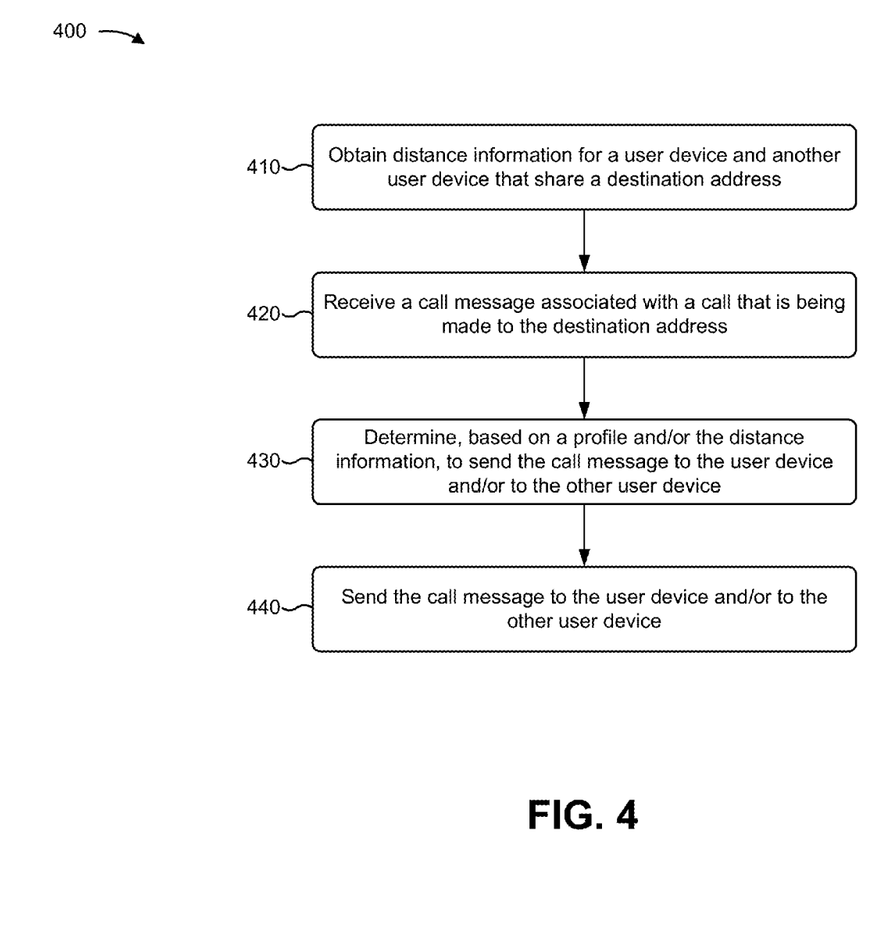
FIG. 4 is a flow chart of an example process for selective call routing and notification for multi-endpoint terminals.

FIG. 4 is a flow chart of an example process 400 for selective call routing and notification for multi-endpoint terminals. In some implementations, one or more process blocks of FIG. 4 may be performed by IMS network device 245. In some implementations, one or more process blocks of FIG. 4 may be performed by another device or a group of devices separate from or including IMS network device 245, such as primary user device 205, secondary user device 210, wireless access point 215, base station 220, MME 225, HSS/AAA 230, SGW 235, and/or PGW 240.

As shown in FIG. 4, process 400 may include obtaining distance information for a user device and another user device that share a destination address (block 410). For example, IMS network device 245 may obtain distance information for primary user device 205 and secondary user device 210 (e.g., information representative of a distance between primary user device 205 and secondary user device 210), which may both be associated with the same destination address. In some implementations, IMS network device 245 may obtain distance information for a first secondary user device 210 and a second secondary user device 210 (e.g., information representative of a distance between the first secondary user device 210 and the second secondary user device 210), both of which may be associated with the same destination address.

The destination address may be associated with multiple user devices. For example, the destination address may be associated with primary user device 205 and secondary user device 210. In other words, the destination address may be shared by multiple user devices (e.g., a multi-endpoint terminal that includes primary user device 205 and secondary user device 210). In some implementations, IMS network device 245 may receive an indication that the destination address is associated with multiple user devices. In other words, IMS network device 245 may receive an indication that the destination address is a shared destination address.

In some implementations, IMS network device 245 may receive an indication that the destination address is a shared destination address when primary user device 205 and/or secondary user device 210 registers with an IMS network, associated with IMS network device 245, to access IMS services (e.g., VoIP, SMS over IMS, a media session, or the like) provided via the IMS network. For example, when IMS network device 245 includes a telecommunication application server, IMS network device 245 may receive an indication that the destination address is a shared destination address when the telecommunication application server receives, from primary user device 205 and/or from secondary user device 210, a registration message (e.g., a SIP REGISTER request message or the like) that indicates that primary user device 205 and secondary user device 210 are both associated with the destination address. In some implementations, IMS network device 245 may query HSS/AAA 230 to determine that the destination address is associated with multiple user devices.

The distance information may indicate a spatial relationship between primary user device 205 and secondary user device 210. In some implementations, the distance information may indicate whether a distance between primary user device 205 and secondary user device 210 is determined to be greater than or less than a threshold distance. In some implementations, the threshold distance may be set by a user (e.g., a user of primary user device 205 and/or of secondary user device 210). In some implementations, the threshold distance may be set by a network operator (e.g., an operator of an IMS network associated with IMS network device 245 and/or an operator of an LTE network associated with base station 220).

In some implementations, the distance between primary user device 205 and secondary user device 210 may be determined to be less than the threshold distance when primary user device 205 and secondary user device 210 are sufficiently proximate to each other that a user may substantially simultaneously perceive both a first call notification provided by primary user device 205 and a second call notification provided by secondary user device 210. In other words, the distance may be determined to be less than the threshold distance when primary user device 205 and secondary user device 210 are sufficiently proximate to each other that a user could be expected to receive and/or respond to a call notification provided by either primary user device 205 or secondary user device 210. For example, the distance may be determined to be less than the threshold distance when primary user device 205 and secondary user device 210 are both being worn by a user, are both in the same room, are both in the same building, are both in the same vehicle, or the like. In some implementations, the threshold distance may be a distance of between about 5 meters to about 20 meters.

In some implementations, the distance between primary user device 205 and secondary user device 210 may be determined to be greater than the threshold distance when a user is not able to substantially simultaneously perceive a first call notification provided by primary user device 205 and a second call notification provided by secondary user device 210. In other words, the distance may be determined to be greater than the threshold distance when primary user device 205 and secondary user device 210 are sufficiently far enough apart that a user proximate to primary user device 205 would not be expected to receive and/or respond to a call notification provided by secondary user device 210. For example, the distance may be determined to be greater than the threshold distance when primary user device 205 and secondary user device 210 are not both in the same room, are not both in the same building, are not both in the same vehicle, or the like.

In some implementations, IMS network device 245 may obtain distance information from primary user device 205 and/or from secondary user device 210. For example, primary user device 205 and/or secondary user device 210 may determine distance information for primary user device 205 and secondary user device 210 (e.g., a distance between primary user device 205 and secondary user device 210) and/or distance information for a first secondary user device 210 and a second secondary user device 210 (e.g., a distance between the first secondary user device 210 and the second secondary user device 210). After determining the distance information, primary user device 205 and/or secondary user device 210 may send the distance information to IMS network device 245.

In some implementations, primary user device 205 and/or secondary user device 210 may determine distance information based on a signal strength (e.g., a BLUETOOTH received signal strength indication (RSSI) value, a received channel power indicator (RCPI) value, a ZIGBEE signal strength, or the like) measured by primary user device 205 and/or secondary user device 210. For example, primary user device 205 and/or secondary user device 210 may determine that a distance between primary user device 205 and secondary user device 210 is less than a threshold distance when a signal strength measured between primary user device 205 and secondary user device 210 is greater than a signal threshold. Alternatively, primary user device 205 and/or secondary user device 210 may determine that the distance between primary user device 205 and secondary user device 210 is greater than the threshold distance when the signal strength measured between primary user device 205 and secondary user device 210 is less than the signal threshold.

In some implementations, the signal threshold may be based on the threshold distance. For example, the signal threshold may correspond to a signal strength for a short-range wireless communication signal (e.g., a Bluetooth signal, a Bluetooth low energy signal, a ZigBee signal, or another type of signal) that has travelled the threshold distance. In some implementations, the signal threshold may be based on information in the profile. For example, the profile may specify a signal threshold (e.g., based on input from a user and/or from a network operator).

In some implementations, primary user device 205 and/or secondary user device 210 may determine distance information based on a response signal received from another user device. For example, primary user device 205 and/or secondary user device 210 may send a signal (e.g., a high frequency audio signal or the like) to another user device. Based on receiving the signal, the other user device may send a response signal to primary user device 205 and/or secondary user device 210. Primary user device 205 and/or secondary user device 210 may determine distance information based on the response signal (e.g., based on a time delay for the response signal, phase information for the response signal, or the like).

In some implementations, primary user device 205 and/or secondary user device 210 may determine distance information based on position information for primary user device 205 and/or secondary user device 210. For example, primary user device 205 and/or secondary user device 210 may use position information to determine the distance information when primary user device 205 and/or secondary user device 210 are not able to measure a signal strength due to, for example, low signal strength caused by distance and/or an obstruction, such as a wall. In some implementations, primary user device 205 and/or secondary user device 210 may determine position information based on WiFi information, Global Positioning System (GPS) data, position information received from a network (e.g., from base station 220, MME 225, and/or IMS network device 245), or the like.

In some implementations, IMS network device 245 may receive the distance information when primary user device 205 and/or secondary user device 210 register with an IMS network associated with IMS network device 245. For example, when IMS network device 245 includes a telecommunication application server, IMS network device 245 may receive the distance information when the telecommunication application server receives, from primary user device 205 and/or from secondary user device 210, a registration message that includes the distance information.

In some implementations, IMS network device 245 may receive updated distance information from primary user device 205 and/or secondary user device 210. For example, primary user device 205 and/or secondary user device 210 may send updated distance information to IMS network device 245 when primary user device 205 and/or secondary user device 210 determines that the distance information may have changed. In some implementations, primary user device 205 and/or secondary user device 210 may send the updated distance information to IMS network device 245 based on determining that a change in the distance information satisfies a distance change threshold. Additionally, or alternatively, primary user device 205 and/or secondary user device 210 may periodically send updated distance information to IMS network device 245 (e.g., to provide scheduled updates or the like). In some implementations, primary user device 205 and/or secondary user device 210 may send the updated distance information to IMS network device 245 by way of a registration message that includes the updated distance information. In some implementations, primary user device 205 and/or secondary user device 210 may determine that the distance information may have changed based on primary user device 205 and/or secondary user device 210 detecting a change in a measured signal strength.

In some implementations, IMS network device 245 may obtain the distance information based on determining a distance between primary user device 205 and secondary user device 210. For example, IMS network device 245 may determine a distance between primary user device 205 and secondary user device 210 based on cellular triangulation (e.g., based on observed time difference of arrival (OTDOA) of signals, from primary user device 205 and/or from secondary user device 210, at multiple base stations 220 or the like). Additionally, or alternatively, IMS network device 245 may determine a distance between primary user device 205 and secondary user device 210 based on base station connectivity. For example, if primary user device 205 is connected to a first base station 220 and secondary user device 210 is connected to a second base station 220, IMS network device 245 may determine a distance between primary user device 205 and secondary user device 210 based on a distance between the first base station 220 and the second base station 220.

In some implementations, IMS network device 245 may obtain the distance information based on determining that a distance between primary user device 205 and secondary user device 210 is greater than or less than a threshold distance. In some implementations, IMS network device 245 may determine that a distance between primary user device 205 and secondary user device 210 is greater than or less than a threshold distance based on base station and/or wireless access point connectivity. For example, if primary user device 205 is connected to a first base station 220 and secondary user device 210 is connected to a second base station 220, IMS network device 245 may determine that the distance between primary user device 205 and secondary user device 210 is greater than a threshold distance. In some implementations, if primary user device 205 is connected to a first wireless access point 215 and secondary user device 210 is connected to a second wireless access point 215, IMS network device 245 may determine that the distance between primary user device 205 and secondary user device 210 is greater than a threshold distance. Alternatively, if primary user device 205 and secondary user device 210 are both connected to the same base station 220 and/or to the same wireless access point 215, IMS network device 245 may, in some implementations, determine that a distance between primary user device 205 and secondary user device 210 is less than the threshold distance.

In some implementations (e.g., when IMS network device 245 determines distance information for primary user device 205 and secondary user device 210), IMS network device 245 may send the distance information to primary user device 205 and/or to secondary user device 210.

As further shown in FIG. 4, process 400 may include receiving a call message associated with a call that is being made to the destination address (block 420). For example, IMS network device 245 may receive a call message that is associated with a call that is being made to the destination address shared by primary user device 205 and secondary user device 210. In some implementations, the call message may be a message associated with setting up and/or routing a call (e.g., a voice call, a VoIP call, a video call, a data call, a media session, or the like) to the destination address (e.g., to primary user device 205 and/or to secondary user device 210). For example, the call message may be a SIP INVITE message, an SS7 initial address message (SS7 IAM), or the like.

As further shown in FIG. 4, process 400 may include determining, based on a profile and/or the distance information, to send the call message to the user device and/or to the other user device (block 430). For example, based on receiving the call message, IMS network device 245 may determine whether to send the call message to primary user device 205 and/or to secondary user device 210.

In some implementations, IMS network device 245 may determine whether to send the call message to primary user device 205 and/or to secondary user device 210 based on a profile. In some implementations, the profile may be associated with the destination address, with primary user device 205, with secondary user device 210, and/or with IMS network device 245.

In some implementations, the profile may include information (e.g., rules, preferences, or the like) regarding routing of the call message by IMS network device 245. For example, the profile may include threshold distance information (e.g., for the destination address, for primary user device 205, and/or for secondary user device 210).

In some implementations, the profile may include information regarding when a user device should or should not receive the call message. For example, the profile may include information regarding one or more user devices (e.g., primary user device 205) that should always receive the call message. In some implementations, the profile may include information regarding one or more user devices that may receive the call message when a distance between primary user device 205 and secondary user device 210 is less than the threshold distance. Additionally, or alternatively, the profile may include information regarding one or more user devices that may not receive the call message when the distance is less than the threshold distance. In some implementations, the profile may include information regarding one or more user devices that should not receive the call message when a distance between primary user device 205 and secondary user device 210 is greater than the threshold distance.

In some implementations, a user of primary user device 205 and/or of secondary user device 210 may create the profile using a suitable interface (e.g., a web page, an application on primary user device 205 and/or secondary user device 210, a call to a customer service telephone number, or the like). In some implementations, IMS network device 245 may obtain the profile from primary user device 205 and/or secondary user device 210. In some implementations, IMS network device 245 may receive the profile based on primary user device 205 and/or secondary user device 210 registering with IMS network device 245 (as discussed above in connection with block 410). For example, primary user device 205 and/or secondary user device 210 may send, to IMS network device 245, a registration message that includes the profile and/or instructions for obtaining the profile. In some implementations, IMS network device 245 may obtain the profile from a source other than primary user device 205 and/or secondary user device 210 (e.g., from HSS/AAA 230 and/or via network 250).

The profile may enable a user and/or a network operator to determine situations where a call should not be sent to a user device. Enabling a user and/or a network operator to determine when a call should not sent to a user device may reduce opportunities for unauthorized users to answer calls with secondary user device 210 and/or for an unauthorized secondary user device to pull a call from secondary user device 210 (e.g., when secondary user device 210 might not be proximate an intended recipient for the call).

In some implementations, rules in the profile may cause IMS network device 245 to determine whether to send the call message to primary user device 205 and/or to secondary user device 210 based on the distance information. For example, IMS network device 245 may determine whether to send the call message to primary user device 205 and/or secondary user device 210 based on whether a distance between primary user device 205 and secondary user device 210 is greater than or less than a threshold distance. In some implementations (e.g., when the distance between primary user device 205 and secondary user device 210 is less than a threshold distance), IMS network device 245 may determine that the call message should be sent to both primary user device 205 and secondary user device 210. In some implementations (e.g., when the distance between primary user device 205 and secondary user device 210 is greater than the threshold distance), IMS network device 245 may determine that the call message should be sent to primary user device 205, but not to secondary user device 210.

In some implementations, IMS network device 245 may determine whether to send the call message to primary user device 205 and/or to secondary user device 210 based on the profile and without considering the distance information. For example, a rule in the profile may cause IMS network device 245 to determine that the call message should be sent to both primary user device 205 and secondary user device 210, even when the distance is greater than a threshold distance. Alternatively, a rule in the profile may cause IMS network device 245 to determine that the call message should be sent to primary user device 205, but not to secondary user device 210, even when the distance is less than a threshold distance (e.g., to support call security and/or privacy for the destination address, primary user device 205, and/or secondary user device 210).

As further shown in FIG. 4, process 400 may include sending the call message to the user device and/or to the other user device (block 440). For example, based on determining to send the call message to primary user device 205 and/or to secondary user device 210, IMS network device 245 may send the call message to primary user device 205 and/or to secondary user device 210.

In some implementations, receiving the call message may permit a user device to receive the call, provide a notification of the call, and/or answer the call. In some implementations, a user device that does not receive the call message may not be able to answer the call. For example, if secondary user device 210 does not receive the call message, secondary user device 210 would not have received the call.

In some implementations, in addition to sending the call message, IMS network device 245 may send notification information regarding whether primary user device 205 and/or secondary user device 210 should provide a notification of the call and a notification type (as discussed below in connection with block 530) that primary user device 205 and/or secondary user device 210 should provide, if any. In some implementations, IMS network device 245 may send the notification information in a SIP INVITE message or the like.

In this way, implementations described herein may enable selective call routing for multi-endpoint terminals. Selective call routing for multi-endpoint terminals may conserve network resources by selectively sending a call to less than all of the user devices associated with a destination address, may conserve user device processor and/or power resources by reducing the number of calls a user device receives, and/or may improve call security and/or privacy by not sending a call to a user device that is not proximate to a primary user device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
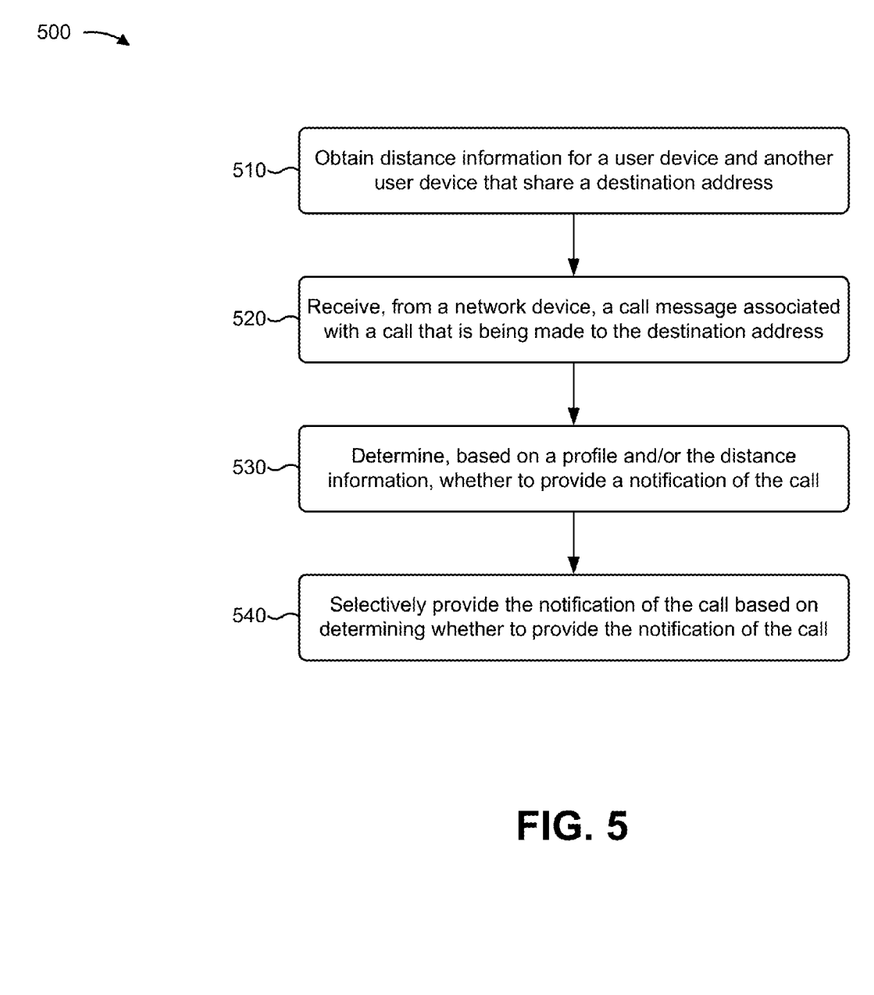
FIG. 5 is a flow chart of another example process for selective call routing and notification for multi-endpoint terminals.

FIG. 5 is a flow chart of another example process 500 for selective call routing and notification for multi-endpoint terminals. In some implementations, one or more process blocks of FIG. 5 may be performed by primary user device 205 and/or by secondary user device 210. In some implementations, one or more process blocks of FIG. 5 may be performed by another device or a group of devices separate from or including primary user device 205 and/or secondary user device 210, such as wireless access point 215, base station 220, MME 225, HSS/AAA 230, SGW 235, PGW 240, and/or IMS network device 245.

As shown in FIG. 5, process 500 may include obtaining distance information for a user device and another user device that share a destination address (block 510). For example, primary user device 205 and/or secondary user device 210 may obtain distance information for primary user device 205 and secondary user device 210 (e.g., a distance between primary user device 205 and secondary user device 210), both of which may be associated with the same destination address. In some implementations, a first secondary user device 210 may obtain distance information for the first secondary user device 210 and a second secondary user device 210 (e.g., a distance between the first secondary user device 210 and the second secondary user device 210), both of which may be associated with the same destination address.

In some implementations, a user device (e.g., primary user device 205, a first secondary user device 210, and/or a second secondary user device 210) may determine, receive, and/or send distance information for the user device and another user device, as discussed above with regard to block 410 of FIG. 4. In some implementations, a user device may receive distance information from IMS network device 245 and/or from another user device. For example, a user device may receive, from IMS network device 245, distance information that had been determined by another user device and then sent to IMS network device 245. Additionally, or alternatively, a user device may receive distance information from another user device that determined the distance information and/or that received the distance information from IMS network device 245. In some implementations, a user device may send the distance information to another user device and/or to IMS network device 245.

As further shown in FIG. 5, process 500 may include receiving, from a network device, a call message associated with a call that is being made to the destination address (block 520). For example, primary user device 205 and/or secondary user device 210 may receive, from IMS network device 245, the call message (e.g., a SIP INVITE message, an SS7 IAM, or the like) associated with setting up and/or routing a call to the shared destination address.

In some implementations (e.g., as discussed above with regard to blocks 430 and 440 of FIG. 4), primary user device 205 and/or secondary user device 210 may receive the call message based on IMS network device 245 having determined to send the call message to primary user device 205 and/or to secondary user device 210 based on a call having been made to the destination address. In some implementations (e.g., as discussed above with regard to blocks 430 and 440 of FIG. 4), primary user device 205 and/or secondary user device 210 may not receive the call message.

As further shown in FIG. 5, process 500 may include determining, based on a profile and/or the distance information, whether to provide a notification of the call (block 530). For example, based on primary user device 205 and/or secondary user device 210 receiving the call message, primary user device 205 and/or secondary user device 210 may determine whether to provide a notification (e.g., a notification that a call has been received). In some implementations, determining whether to provide a notification based on the call being received may include determining a notification type that primary user device 205 and/or secondary user device 210 should provide. A notification type may include, for example, an audible notification (e.g., a ring, a ringtone, or the like), a vibration, and/or a visual notification (e.g., flashing lights, providing an SMS message, displaying call information and/or an image, or the like).

In some implementations, primary user device 205 and/or secondary user device 210 may determine whether to provide a notification of a received call and/or determine a notification type based on a profile (e.g., the profile discussed above with regard to block 430 of FIG. 4). For example, the profile may include information (e.g., a rule, a preference, or the like) regarding whether a user device should provide a notification, based on receiving a call, and what notification type should be provided.

In some implementations, a rule in the profile may cause primary user device 205 and/or secondary user device 210 to determine whether to provide a notification, and what notification type should be provided, based on the distance information. For example, when a distance between primary user device 205 and secondary user device 210 is less than a threshold distance, primary user device 205 and/or secondary user device 210 may determine that primary user device 205 may provide a primary notification type (e.g., audible, vibrate, or the like), while secondary user device 210 should either not provide a notification or should provide a secondary notification type (e.g., a silent notification, such as displaying call information, a text message, an SMS message, or the like). Causing a secondary user device 210 to provide a secondary notification type when close to primary user device 205 may prevent multiple user devices from providing, for example, multiple simultaneous audible notifications at or near a single location. In some implementations, any of the notification types described herein may be used as a primary notification type and/or as a secondary notification type.

Alternatively, when the distance between primary user device 205 and secondary user device 210 is greater than the threshold distance, primary user device 205 and/or secondary user device 210 may determine that primary user device 205 and/or secondary user device 210 may provide unrestricted notification types (e.g., as specified in the profile). Permitting unrestricted notification types by primary user device 205 and secondary user device 210 when the distance is greater than the threshold distance may permit non-proximate user devices to provide notifications at multiple locations, which may increase the chance of a call reaching an intended recipient.

In some implementations, a rule in the notification profile may cause primary user device 205 and/or secondary user device 210 to determine whether to provide a notification that a call has been received, without considering the distance information. For example, a rule in the notification profile may cause primary user device 205 to always provide a notification (e.g., a notification type specified in the profile) when a call has been received.

In some implementations, primary user device 205 and/or secondary user device 210 may determine whether to provide a notification of the call, and/or a notification type, based on a message received from IMS network device 245. For example, primary user device 205 and/or secondary user device 210 may determine whether to provide a notification of the call, and/or a notification type, based on notification information received from IMS network device 245, as discussed above with regard to block 440 of FIG. 4.

In some implementations, based on primary user device 205 and/or secondary user device 210 having received the call message, primary user device 205 and/or secondary user device 210 may cause another user device (e.g., another secondary user device 210) associated with the destination address to provide a notification of the call. For example, primary user device 205 and/or secondary user device 210 may send instructions, to the other user device associated with the destination address, to provide a notification of the call based on primary user device 205 and/or secondary user device 210 having received the call message.

As further shown in FIG. 5, process 500 may include selectively providing the notification of the call based on determining whether to provide the notification of the call (block 540). For example, primary user device 205 and/or secondary user device 210 may selectively provide the notification of the call based on primary user device 205 and/or secondary user device 210 having determined whether or not primary user device 205 and/or secondary user device 210 should provide the notification of the call. Selectively providing notification of a call received by a user device may conserve user device processor and/or power resources by reducing call notifications made by a user device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, implementations described herein may enable selective call routing and notification for multi-endpoint terminals. Selective call routing and notification for multi-endpoint terminals may enable a user and/or a network operator to control which user device will receive a call and/or which user device provides a notification of the call. Selective call routing to a subset of user devices associated with a destination address may reduce network resources that might otherwise be consumed by indiscriminately sending a call to all user devices associated with the destination address. Selective call routing and notification may additionally, or alternatively, conserve user device processor and/or power resources by reducing the number of calls a user device receives and/or reducing the number of call notifications a user device makes. Selective call routing may improve call security and/or privacy by not sending a call to a user device that is not proximate to a primary user device, which may prevent an unauthorized user from answering a call and/or may reduce the chances of an unauthorized secondary user device pulling a call from a distant and/or compromised secondary user device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A user device, comprising:
a memory to store instructions; and
one or more processors to execute the instructions to:
obtain distance information representing a distance between the user device and another user device,
the distance information being based on a signal strength for the other user device, and
the user device and the other user device sharing a destination address;
receive a message associated with a call,
the message being received based on the call having been made to the destination address;
determine, based on the distance information, whether to provide a notification of the call; and
selectively provide the notification of the call based on determining whether to provide the notification,
a notification type for the notification being based on whether the signal strength is greater than a signal threshold.

2. The user device of claim 1,
where the message associated with the call is a second message; and where the one or more processors are further to:
 send a first message to a network device before receiving the second message,
  the first message being a registration message and including the distance information.

3. The user device of claim 1,
where the one or more processors, when obtaining the distance information, are to:
 determine the distance between the user device and the other user device; and
where the one or more processors, when determining whether to provide the notification of the call, are to:
 determine whether to provide the notification of the call based on a profile associated with the user device and whether the distance between the user device and the other user device satisfies a threshold distance.

4. The user device of claim 1,
where the one or more processors, when obtaining the distance information, are to:
 determine flail the signal strength based on a signal between the user device and the other user device,
where the one or more processors are further to:
 determine whether the signal strength satisfies flail the signal threshold; and
where the one or more processors, when determining whether to provide the notification of the call, are to:
 determine whether to provide the notification of the call based on whether the signal strength satisfies the signal threshold.

5. The user device of claim 1, where the one or more processors, when obtaining the distance information, are to:
 receive the distance information from a network device.

6. The user device of claim 1, where the one or more processors, when selectively providing the notification of the call, are to:
 provide the notification of the call when the distance between the user device and the other user device is greater than a threshold distance.

7. The user device of claim 1,
where the user device is a secondary user device associated with the destination address and the other user device is a primary user device associated with the destination address; and
where the one or more processors, when selectively providing the notification of the call, are to:
 prevent the secondary user device from providing the notification of the call when at least one of the distance between the primary user device and the secondary user device is less than a threshold distance or a profile associated with the destination address indicates that the primary user device should provide the notification.

8. A non-transitory computer-readable medium storing instructions, the instructions comprising:
 one or more instructions that, when executed by one or more processors, cause the one or more processors to:
  receive a first message from at least one of a first user device or a second user device;
  obtain information from the first message,
   the information being based on a distance between flail the first user device and flail the second user device, and
   the first user device and the second user device sharing a destination address;
  receive a second message associated with a call,
   the second message being received based on the call having been made to the destination address;
  determine, based on the information, to send the second message to at least one of the first user device or the second user device; and
  send the second message to the at least one of the first user device or the second user device.

9. The non-transitory computer-readable medium of claim 8,
where the one or more instructions, that cause the one or more processors to determine to send the second message to the at least one of the first user device or the second user device, cause the one or more processors to:
 determine to send the second message to the first user device; and
 determine to not send the second message to the second user device.

10. The non-transitory computer-readable medium of claim 8,
where the one or more instructions, when executed by the one or more processors, further cause the one or more processors to:
 determine that the distance between the first user device and the second user device is greater than a threshold distance; and
where the one or more instructions, that cause the one or more processors to determine to send the second message to the at least one of the first user device or the second user device, cause the one or more processors to:
 determine to send the second message to the first user device and to the second user device based on determining that the distance between the first user device and the second user device is greater than the threshold distance.

11. The non-transitory computer-readable medium of claim 8,
where the first user device is a first mobile device and the second user device is a second mobile device;
where the one or more instructions, that cause the one or more processors to obtain the information, cause the one or more processors to:
 determine that the first mobile device is connected to a first base station, and
 determine that the second mobile device is connected to a second base station that is different from the first base station; and
where the one or more instructions, that cause the one or more processors to determine to send the second message to the at least one of the first user device or the second user device, cause the one or more processors to:
 determine to send the second message to the first mobile device, and
 determine whether to send the second message to the second mobile device based on a profile associated with the destination address.

12. The non-transitory computer-readable medium of claim 8,
where the one or more instructions, when executed by the one or more processors, further cause the one or more processors to:
 determine that the distance between the first user device and the second user device is less than a threshold distance;
where the one or more instructions, that cause the one or more processors to send the second message to the at least one of the first user device or the second user device, cause the one or more processors to:
send the second message to the first user device and to the second user device based on determining that the distance between the first user device and the second user device is less than the threshold distance; and
where the one or more instructions, when executed by the one or more processors, further cause the one or more processors to:
send instructions to the second user device to prevent the second user device from providing a notification associated with the second message.

13. A method, comprising:
obtaining, by a first user device, distance information representing a distance between the first user device and a second user device,
the distance information being based on a signal strength for the second user device, and
the first user device and the second user device sharing a destination address;
receiving, by the first user device, a message associated with a call,
the message being received based on the call having been made to the destination address;
determining, by the first user device and based on the distance information, whether to provide a notification associated with the call; and
selectively providing, by the first user device, the notification based on determining whether to provide the notification,
a notification type for the notification being based on whether the signal strength is greater than a signal threshold.

14. The method of claim 13, where obtaining the distance information comprises:
determining the distance between the first user device and the second user device.

15. The non-transitory computer-readable medium of claim 8, where the one or more instructions, that cause the one or more processors to determine to send the second message to the at least one of the first user device or the second user device, cause the one or more processors to:
determine whether to send the second message to the first user device or the second user device based on a profile associated with the destination address,
the profile including information regarding whether to not send the second message to the first user device or the second user device based on the distance between the first user device and the second user device being greater than a threshold distance.

16. The non-transitory computer-readable medium of claim 15, where the profile is obtained from the first user device or the second user device.

17. The method of claim 13, where the message associated with the call is a first message; and
where the method further comprises:
sending a second message to a network device before receiving the first message,
the second message being a registration message and including the distance information.

18. The method of claim 13, where the notification type includes at least one of:
an audible notification,
a vibration notification, or
a visual notification.

19. The method of claim 13, where the message is a first message; and
where selectively providing the notification comprises:
receiving a second message from a network device; and
selectively providing the notification based on receiving the second message from the network device.

20. The method of claim 13, where the notification type for the notification is a primary notification type comprising an audible notification or a vibration notification; and
where the second user device provides a secondary notification type comprising a displayed notification.

* * * * *